C. C. BOOTH.
EGG BEATER.
APPLICATION FILED JAN. 14, 1910.
1,003,425.
Patented Sept. 19, 1911.
2 SHEETS—SHEET 1.
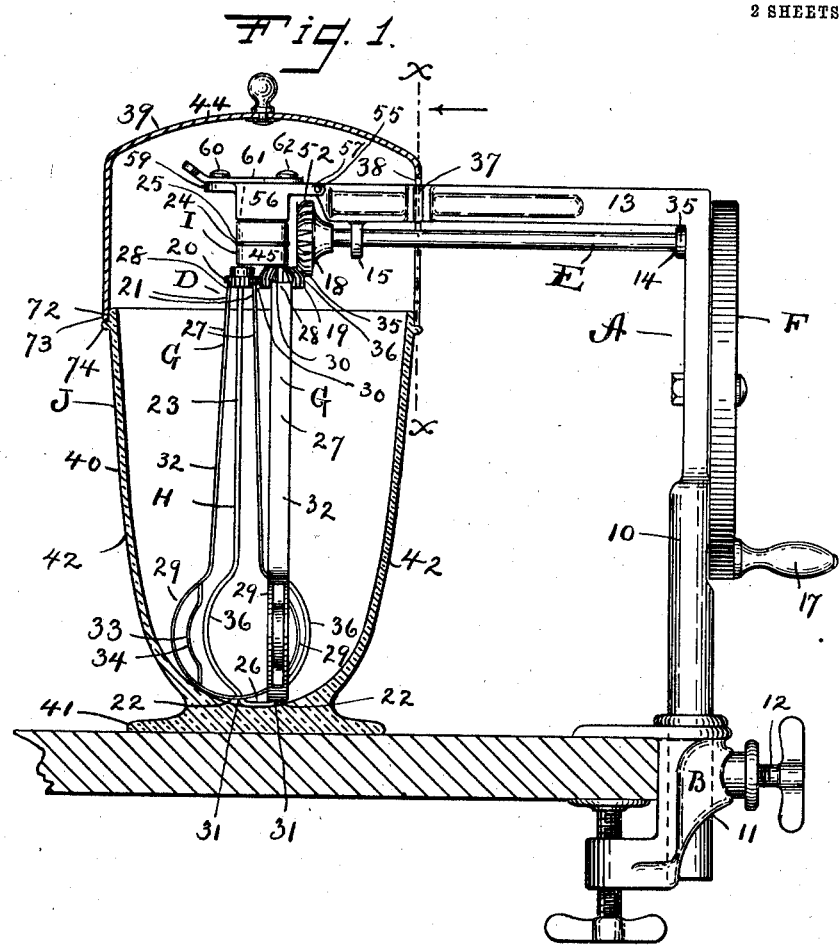
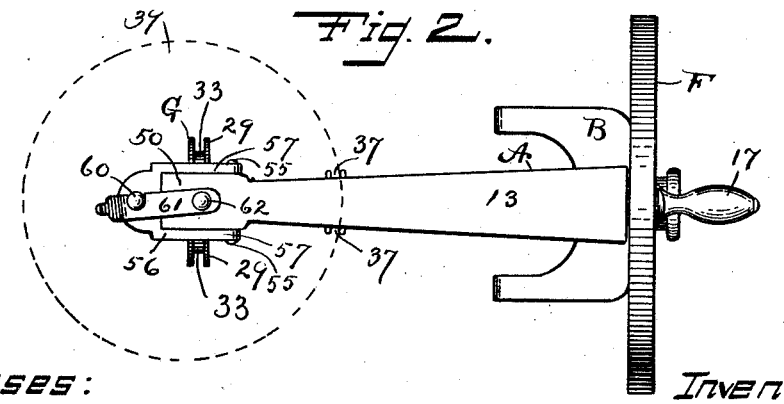
Witnesses:
Inventor.
Charles C. Booth
By Louis M. Schmidt
Atty.

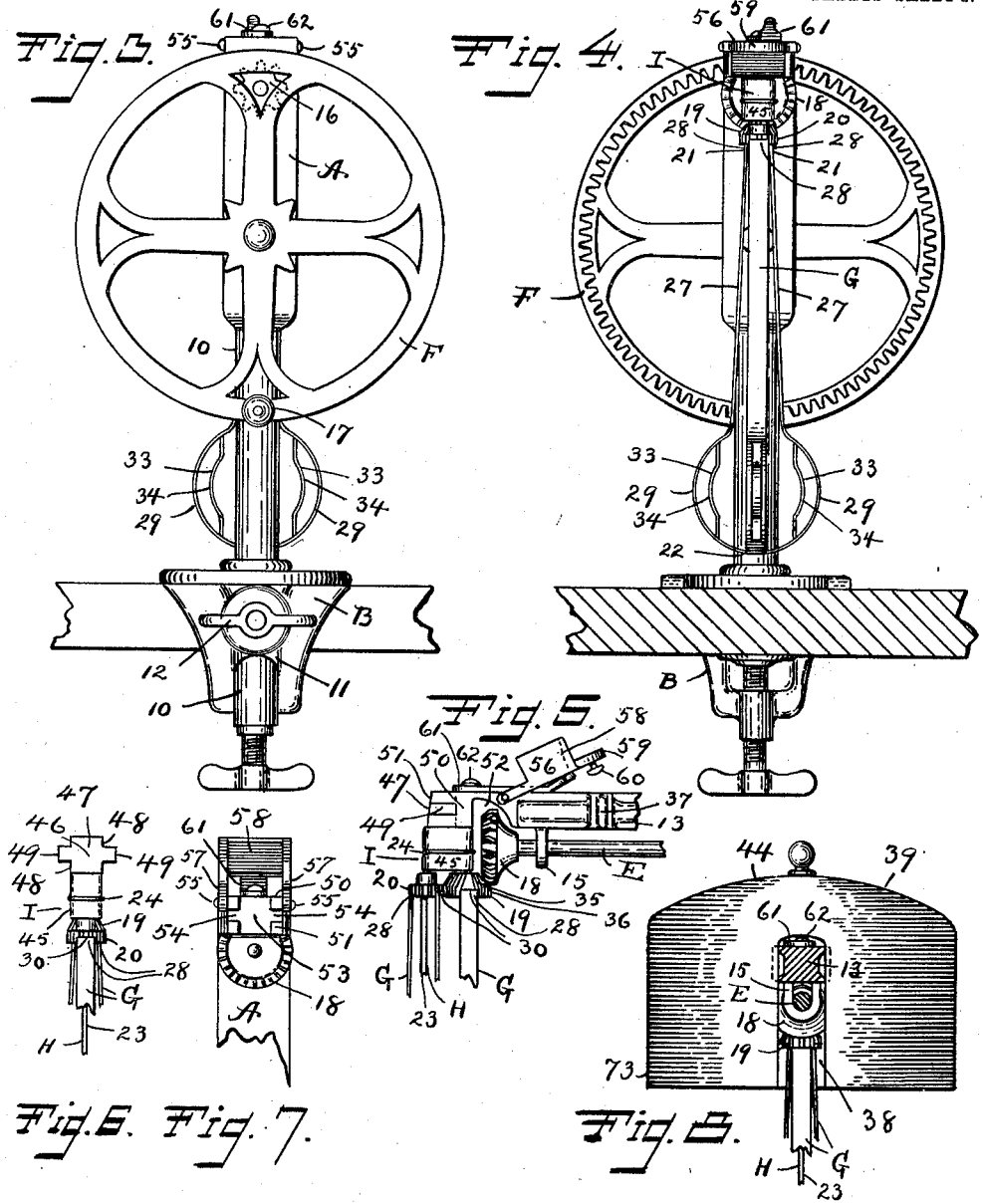

UNITED STATES PATENT OFFICE.

CHARLES C. BOOTH, OF PLAINVILLE, CONNECTICUT, ASSIGNOR TO CHARLES D. BISHOP, OF NEW BRITAIN, CONNECTICUT, AND LOUIS M. SCHMIDT, OF HARTFORD, CONNECTICUT.

EGG-BEATER.

1,003,425.   Specification of Letters Patent.   Patented Sept. 19, 1911.

Application filed January 14, 1910. Serial No. 537,996.

*To all whom it may concern:*

Be it known that I, CHARLES C. BOOTH, a citizen of the United States, residing at Plainville, in the county of Hartford and State of Connecticut, have invented certain new and useful Improvements in Egg-Beaters, of which the following is a specification.

My invention relates to improvements in egg beaters and the objects of my improvements are simplicity and economy in construction and convenience and efficiency in use.

In the accompanying drawings: Figure 1 is a side elevation of my egg beater, with the jar and cover in section. Fig. 2 is a plan view of the same, the jar being omitted, and the position of the cover indicated by broken lines. Fig. 3 is a front elevation of the same, the jar and cover being omitted. Fig. 4 is a rear elevation of the parts shown in Fig. 3. Fig. 5 is a side elevation of the locking mechanism. Figs. 6 and 7 are detail views of part of the same. Fig. 8 is a sectional view on the line x x of Fig. 1.

My egg beater comprises an upright or standard A, consisting of a cylindrical post 10 adjustably receivable in a socket 11 in a clamp B and held in adjusted position in the same by means of a set screw 12. The clamp B is provided with means for attachment to a board or table in an ordinary manner.

The upper part of the standard A is provided with a laterally extending arm 13 having at its outer end means for removably supporting the egg beater proper D, all of which will be described. The said arm 13 is provided at the outer sides with a pair of parallel vertical guide ways 37 for the edges of a slot 38 in a cover 39 for a dish or jar J which may be used in connection with my beater for beating substances or mixtures that are liable to spatter and be thrown about, as for whipping cream. Below said outwardly extending arm 13 the said standard A is provided with means for support for the driving shaft E. The said shaft E is generally horizontal, has an inner bearing 14 in the body portion of the standard A and an outer bearing in a downwardly projecting lug 15 on the said arm 13. The said shaft extends beyond the said bearings 14 and 15 on each end, and the inner end is provided with a train of gears F for the application of driving power comprising a pinion 16 on the said shaft E and a combined crank and driving gear F coöperating with the same and provided with an operating handle 17. The said shaft E is held longitudinally in place by the said pinion 16 on one side and a collar 35 on the other side of the body portion of the standard A. On the outer end the said shaft E is provided with a bevel gear 18 adapted to mesh with a gear 19 on the adjacent vane or blade G of the egg beater proper, which in turn meshes with a gear 20 on the other of the vanes G. The said egg beater proper D comprises a pair of the said vanes G, generally similar and each made of a strip of sheet metal, bent generally into loop form and pivotally mounted by the ends 21 and apex 22 on a supporting loop H of wire. The upper loop ends are provided with the said gears, 19 and 20. The said supporting loop H comprises a U-shaped loop of wire having two generally straight and parallel vertical arms 23, the upper ends being secured in a supporting block I in an ordinary manner, as by a wire 24 in a groove 25. The lower parts 36 are curved outwardly to clear the vanes G and the extreme lower ends are cross-connected by an essentially straight connection 26, also in an ordinary manner. The vanes G as described comprise loops having loop arms 27, the upper ends 28 of which overlap and are mounted by means of bearing holes on the said supporting loop arms 23 and housed in grooves 30 in the bottom ends of the said gears 19 and 20. The lower end or apex 22 of the loop is generally horizontal or only slightly curved, and is provided with a bearing hole 31 for mounting on the said supporting arm 23. Intermediate the said ends 28 and apex 22 the said loop arms 27 have an upper portion comprising a pair of straight arms 32 extending downward and flaring slightly outwardly from the said upper ends 28 and a lower portion comprising an essentially circular contour for the loop arms generally as shown at 29. I provide the said circular or arc shaped portion 29 of my vanes G with a generally vertical chord-like member 33 cross-connecting points on the said arc-shaped portion 29 appreciably separated. As shown the said chord member 33 is formed integral with the said arc member 29 by slitting the same longitudinally, and the said chord member is provided with a lateral bend 34 which provides additional beating surface or edge and at the same time serves to take up the surplusage of length of the arc over the length of the chord and to avoid contact with the said arc-shaped portion 29 of the supporting loop H. The said gear 19 is a combination of a bevel gear 35 adapted to engage with the driving bevel gear 18, and of a parallel gear 36 adapted to engage with the said gear 20, which is a parallel gear. Accordingly as described, the said vanes G are operatively mounted on the supporting block I and constitute the egg beater proper D. The said beater proper D is removably supported in operative position by means of the said supporting block I in the following manner. The said block I comprises a lower body portion 45 to which the said vanes G are operatively mounted as described and above the same an upwardly extending neck 46 generally rectangular, but having the outer wall 47 on an incline and having the parallel side walls 48 provided each with a lug 49, the said head and lugs being receivable in the head 50 provided on the end of the said lateral supporting arm 13. The said head 50 on the arm 13 comprises a generally flat and rectangular top surface, having parallel and perpendicular side walls and an inclined outer wall 51 to correspond with the said inclined wall 47 on said neck 46. The inner end of the bottom side of said head 50 has a recess 52 to provide clearance for the said bevel gear 18. Outwardly from said recess 52 the said head 50 is provided with a main recess 53 a fit for and adapted to receive the said neck 46 and a pair of lateral recesses or slots 54 a fit for and adapted to receive the said lugs 49. A yoke 56 of U shape having inwardly directed arms 57 is pivoted by the inner ends of said arms as shown at 55 and is adapted to inclose the said neck 46 and head 50 as a unit and hold the same rigidly, having an inclined surface 58 at the front corresponding to the inclined surfaces 51 and 47 described. When engaged as described the top surface of said yoke is flush with the top surface of the head 50, and the said top surface of the yoke is extended outwardly by means of an ear 59 so as to provide a point of attachment for a stop or keeper 60 for a latch 61, which latch is a flat arm pivotally mounted on a pin 62 on said head 50, appreciably inward from the said keeper so that when engaged therewith the same will hold the yoke 56 in engagement with the said head 50 and block I as described and thereby hold the beater proper D in operative position relatively to the driving mechanism.

The said jar J comprises a vessel 40, preferably of glass, having a substantial base 41 and side walls 42 extending upward so as to inclose the beater proper D, and an interior contour rounded at the bottom so as to conform substantially to the space requirements for the revolution of the vanes G. The top is provided on the outside with a cylindrical neck 72 of appreciable depth, which is a fit for a corresponding neck 73 on the cover 39 and is limited by the shoulder 74. The said cover 39 has cylindrical side walls generally comprising an extension of the said neck 73, which extend upwardly to the top of the said slot 38 which corresponds to a condition of adjustment in which the beater proper is in the lowest possible position in the jar J, the cover 39 is resting on the rib or shoulder 73 and the slot 38 just clears the arm 13. The top 44 of the cover is dome-shaped and extends over the top of the beater proper D.

My egg beater as described is adjusted as to height and as to lateral position relatively to the means of support, has improved efficiency due to the chord member provided in the vane, is firmly and rigidly supported and adapted for heavy service involving power and speed, is provided with a jar that is positively located in the proper position for efficient operation, is protected against objectionable splashing and has the beater proper rigidly and at the same time removably supported in operative position.

I claim as my invention:—

1. In an egg beater having a beater proper operatively mounted on an outwardly extending arm and a jar having an interior surface essentially an operative fit for said beater proper, means for retaining said jar, and beater in proper operative position comprising a cover for said jar, guide ways on said arm, and an upwardly extending neck on said jar, the said cover a fit for said neck and provided with a slot adapted to receive said arm and having guide walls fitting said ways.

2. In an egg beater having an egg beater proper provided with means for being removably supported in operative position, the said means comprising a block supporting said beater proper and provided with a head, a supporting bracket having an arm adapted to support said block, the said block provided with an upwardly extending neck provided with lateral lugs, the said arm provided with coacting slots adapted to receive said neck and lugs, a yoke pivotally mounted on said arm and adapted to be swung into position so as to surround said neck when engaged with said slot and hold the same so engaged and a latch pivotally mounted on said arm, bridging the outer end of said yoke and locking the same in such holding position.

3. In an egg beater comprising a beater proper having a neck and a standard having a head, the said neck receivable in the said head, locking mechanism suitable for locking said neck and head comprising a swinging yoke pivoted on said standard and inclosing said neck and head, and a latch locking the said yoke in such inclosing position.

4. An egg beater comprising a beater proper, operating mechanism, and a standard, the said beater proper comprising a self-contained duplex combination consisting of a pair of vanes revoluble on adjacent parallel axes, the said mechanism comprising a shaft permanently supported by the said standard, and the said standard provided with means for removably receiving the said beater proper and for securing the same in operative relation to the said shaft, the said means comprising a neck on the said beater proper fitting a socket on the said standard, and receivable therein, and latching mechanism suitable for locking the said neck in the said socket.

CHARLES C. BOOTH.

Witnesses:
SHEFFIELD H. CLARKE,
NEWTON L. LOCKWOOD.

---

Copies of this patent may be obtained for five cents each, by addressing the "Commissioner of Patents, Washington, D. C."